United States Patent
Kim et al.

(10) Patent No.: US 9,245,687 B2
(45) Date of Patent: Jan. 26, 2016

(54) MULTILAYER CERAMIC CAPACITOR AND MANUFACTURING METHOD THEREOF

(71) Applicant: SAMSUNG ELECTRO-MECHANICS CO., LTD., Suwon, Gyunggi-do (KR)

(72) Inventors: Hyun Tae Kim, Gyunggi-do (KR); Kyu Ree Kim, Gyunggi-do (KR); Mi Jeong Chang, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 221 days.

(21) Appl. No.: 14/144,414

(22) Filed: Dec. 30, 2013

(65) Prior Publication Data

US 2015/0043124 A1  Feb. 12, 2015

(30) Foreign Application Priority Data

Aug. 9, 2013  (KR) ......................... 10-2013-0094837

(51) Int. Cl.
*H01G 4/232* (2006.01)
*H01G 4/005* (2006.01)
*H01G 4/12* (2006.01)
*H01G 4/30* (2006.01)

(52) U.S. Cl.
CPC .................. *H01G 4/005* (2013.01); *H01G 4/12* (2013.01); *H01G 4/30* (2013.01); *H01G 4/232* (2013.01); *H01G 4/2325* (2013.01)

(58) Field of Classification Search
CPC ......... H01G 4/30; H01G 4/005; H01G 4/008; H01G 4/228; H01G 4/232; H01G 4/2325
See application file for complete search history.

(56) References Cited

U.S. PATENT DOCUMENTS

| | | | | |
|---|---|---|---|---|
| 5,508,562 A | * | 4/1996 | Horie | ..................... H01C 1/142 257/772 |
| 2002/0006023 A1 | * | 1/2002 | Maegawa | ............... H01G 4/232 361/305 |

(Continued)

FOREIGN PATENT DOCUMENTS

| | | |
|---|---|---|
| JP | 9-205005 A | 8/1997 |
| JP | 2002-217054 A | 8/2002 |

(Continued)

OTHER PUBLICATIONS

Japanese Office Action dated Jun. 16, 2015 issued in corresponding Japanese Patent Application No. 2013-261346, with English Translation.

*Primary Examiner* — Dion R Ferguson (74) *Attorney, Agent, or Firm* — McDermott Will & Emery LLP (57) ABSTRACT

There is provided a multilayer ceramic capacitor, including a ceramic body, a plurality of first and second internal electrodes, and first and second external electrodes, wherein the first and second external electrodes include first and second internal layers including first and second internal head portions and first and second internal bands formed on both main surfaces of the ceramic body, and first and second external layers including first and second external head portions and first and second external bands formed on the first and second internal bands and having a distance shorter than a distance of the first and second internal bands, the first and second external layers having viscosity higher than that of the first and second internal layers.

19 Claims, 4 Drawing Sheets

(56) References Cited

U.S. PATENT DOCUMENTS

| | | |
|---|---|---|
| 2002/0050909 A1 | 5/2002 | Jinno et al. |
| 2005/0083637 A1* | 4/2005 | Yoshll .................. H01G 4/2325 361/600 |
| 2006/0044098 A1* | 3/2006 | Kimura .................... H01B 1/22 336/122 |
| 2009/0040688 A1* | 2/2009 | Kayatani .............. H01G 4/2325 361/321.1 |
| 2011/0299221 A1 | 12/2011 | Higashi et al. |
| 2012/0019981 A1 | 1/2012 | Yoshida |
| 2013/0134836 A1 | 5/2013 | Hwang et al. |

FOREIGN PATENT DOCUMENTS

| | | |
|---|---|---|
| JP | 2007-123389 A | 5/2007 |
| JP | 2008-071926 A | 3/2008 |
| JP | 2011-108874 A | 6/2011 |
| JP | 2012-044149 A | 3/2012 |
| JP | 2013-115424 A | 6/2013 |
| KR | 10-2011-0133431 A | 12/2011 |
| WO | 2012/114925 A1 | 8/2012 |

* cited by examiner

MULTILAYER CERAMIC CAPACITOR AND MANUFACTURING METHOD THEREOF

CROSS-REFERENCE TO RELATED APPLICATION

This application claims the benefit of Korean Patent Application No. 10-2013-0094837 filed on Aug. 9, 2013, with the Korean Intellectual Property Office, the disclosure of which is incorporated herein by reference.

BACKGROUND

The present disclosure relates to a multilayer ceramic capacitor and a manufacturing method thereof.

Multilayer ceramic capacitors (MLCC), multilayer chip electronic components, may be used in various electronic devices due to advantages in which a size is relatively small, high capacitance may be secured, and it may be easily mounted.

For example, the multilayer ceramic capacitors may be used in capacitors having a chip form mounted on printed circuit boards of several electronic products such as imaging devices such as liquid crystal displays (LCD), plasma display panels (PDP), and the like, computers, personal digital assistants (PDA), and mobile phones to thereby serve to charge or discharge electricity.

Recently, in accordance with the miniaturization of electronic products, it is also demanded to allow multilayer ceramic capacitors used in the electronic products to have a sub-miniaturized size and ultra high capacitance.

Therefore, multilayer ceramic capacitors in which thicknesses of dielectric layers and internal electrodes are decreased in order to allow the electronic products to have a sub-miniaturized size and a plurality of dielectric layers are stacked in order to allow the electronic products to have ultra high capacitance has been manufactured.

Particularly, in a case of so-called low profile or embedded products having a relatively thin thickness as compared to length and width sizes, thickness thinness of bands of external electrodes is required to obtain high capacitance.

However, in the case in which the thickness of bands of the external electrodes is excessively decreased for the high capacitance, a phenomenon in which a plating solution is permeated into a chip during a plating process to contact the internal electrodes may be caused, thereby degrading product reliability.

The following Related Art Documents disclose a multilayer ceramic capacitor having an external electrode of a double layer structure, but do not disclose a structure in which an end portion of an internal layer of the external electrode is exposed externally and do not disclose that an external layer of the external electrode is formed using a paste having higher viscosity than that of the internal layer thereof.

RELATED ART DOCUMENT

Korean Patent Laid-Open Publication No. 2011-0133431
Japanese Patent Laid-Open Publication No. H9-205005

SUMMARY

An aspect of the present disclosure may provide a new scheme for improving reliability of a product by preventing a phenomenon in which a plating solution permeates into a chip to contact an internal electrode during a plating process, while obtaining an external electrode band having a relatively thin thickness on a thin multilayer ceramic capacitor thin.

According to an aspect of the present disclosure, a multilayer ceramic capacitor may include: a ceramic body having a plurality of dielectric layers stacked therein; a plurality of first and second internal electrodes disposed in the ceramic body so as to be alternately exposed through both end surfaces of the ceramic body, having the dielectric layer interposed therebetween; and first and second external electrodes respectively electrically connected to the first and second internal electrodes, wherein the first and second external electrodes include first and second internal layers respectively formed on both end surfaces of the ceramic body and including first and second internal head portions respectively electrically connected to exposed portions of the first and second internal electrodes and first and second internal bands formed on both main surfaces of the ceramic body;

and first and second external layers including first and second external head portions respectively formed on the first and second internal head portions and first and second external bands formed on the first and second internal bands and having a distance shorter than a distance of the first and second internal bands formed on the first and second main surfaces, the first and second external layers having viscosity higher than that of the first and second internal layers.

The first and second internal layers may have the viscosity of 5,000 to 30,000 cps.

The first and second external layers may have the viscosity of 7,500 to 62,500 cps.

The first and second external layers may have the viscosity of 1.5 to 2.5 times that of the first and second internal layers.

The ceramic body may have a length, a width, and a thickness of 1.0 mm or less, 0.5 mm or less, and 0.2 mm or less, respectively.

The ceramic body may have a length and a width of 1.0 mm or less and 0.5 mm or less, respectively, and may have a thickness/width of 0.5 or less When a sum of thicknesses of the first or second internal band and the first or second external band is defined as T1, T1 may be 30 μm or less.

When a sum of thicknesses of the first or second internal head portion and the first or second external head portion is defined as HT, HT may be 10 μm or more.

When a thickness of the first or second external band is defined as D1, D1 may be 350 μm or less.

When a sum of thicknesses of the first or second internal band and the first or second external band is defined as T1 and a thickness of the first and second internal bands is defined as T2, a range of $1.2 \geq T2/T1 \geq 0.15$ may be satisfied.

When a sum distances of bands of the first or second external electrode is defined as D2 and a distance of the first or second external band is defined as D1, a range of $0.9 \geq D1/D2 \geq 0.02$ may be satisfied.

When a sum distances of bands of the first or second external electrode is defined as D2 and a distance between internal edges of the first or second internal band and the first or second external band are defined as C, a range of $10.0 \geq C/D2 \geq 0.02$ may be satisfied.

When a thickness of the ceramic body is defined as CT and a thickness of an active region including the plurality of first and second internal electrodes is defined as AT, a range of $0.9 \geq AT/CT \geq 0.28$ may be satisfied.

The first and second internal layers may have a content of a conductive metal of 79 wt % or less.

According to another aspect of the present disclosure, a manufacturing method of a multilayer ceramic capacitor may include: preparing a multilayer body by stacking and compressing a plurality of ceramic sheets having first and second internal electrodes formed thereon so that the first and second internal electrodes are disposed to face each other, having the ceramic sheet interposed therebetween; preparing a ceramic body by cutting the multilayer body into regions corresponding to respective single capacitors so that the first and second internal electrodes are alternately exposed through both end surfaces; and forming first and second external electrodes on the ceramic body so as to be electrically connected to the first and second internal electrodes, respectively, wherein the forming of the first and second external electrodes includes forming first and second internal layers from both end surfaces of the ceramic body to both main surfaces of the ceramic body using a first conductive paste; and forming first and second external layers on the first and second internal layers, using a second conductive paste, such that bands of the first and second internal layers are partially exposed, the second conductive paste having viscosity higher than that of the first conductive paste.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1:
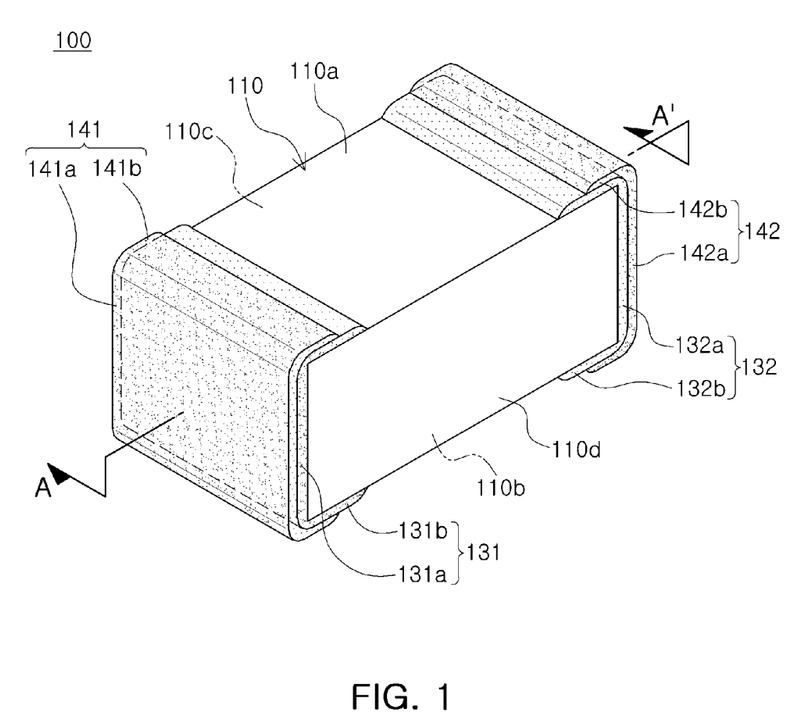
FIG. 1 is a perspective view schematically showing a multilayer ceramic capacitor according to an exemplary embodiment of the present disclosure.
Figure 2:
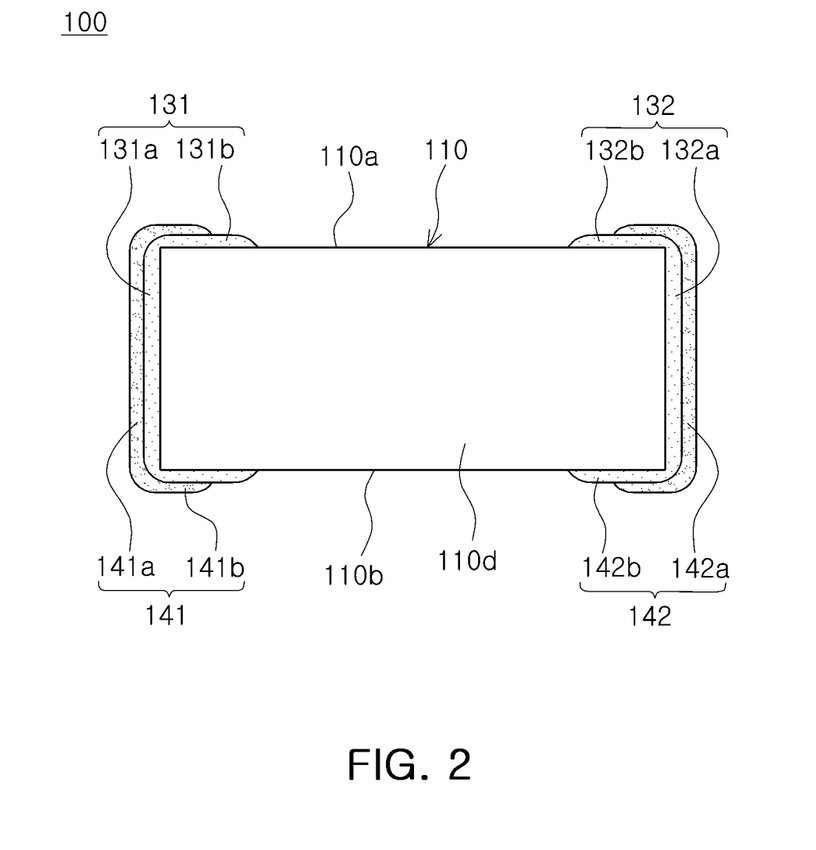
FIG. 2 is a front view of FIG. 1.
Figure 3:
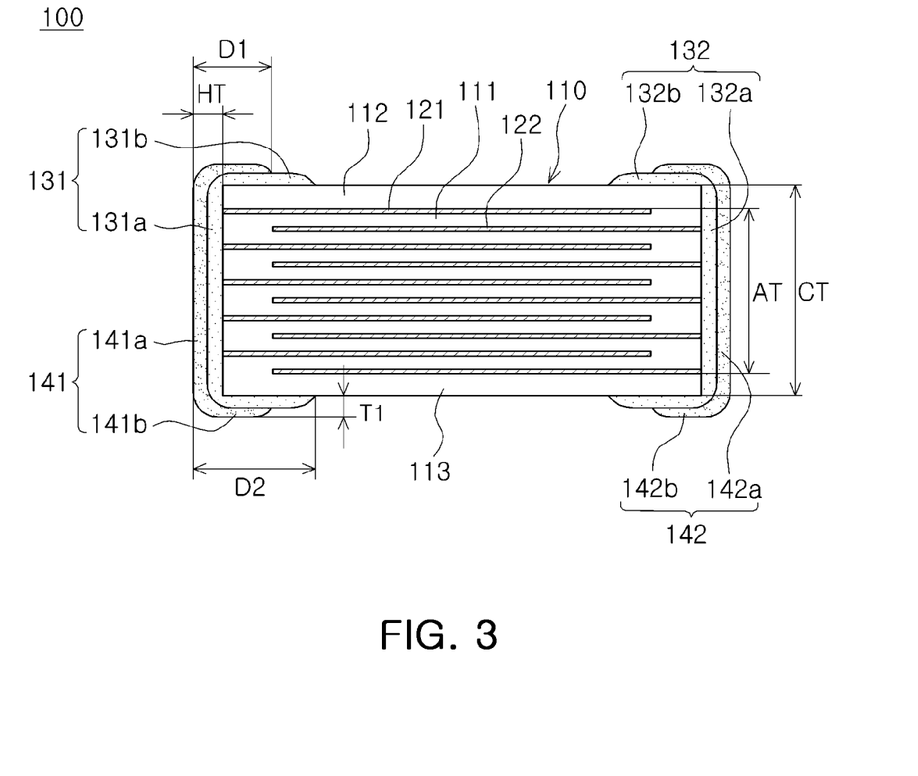
FIGS. 3 and 4 are cross-sectional views taken along line A-A' of FIG. 1.
Figure 4:
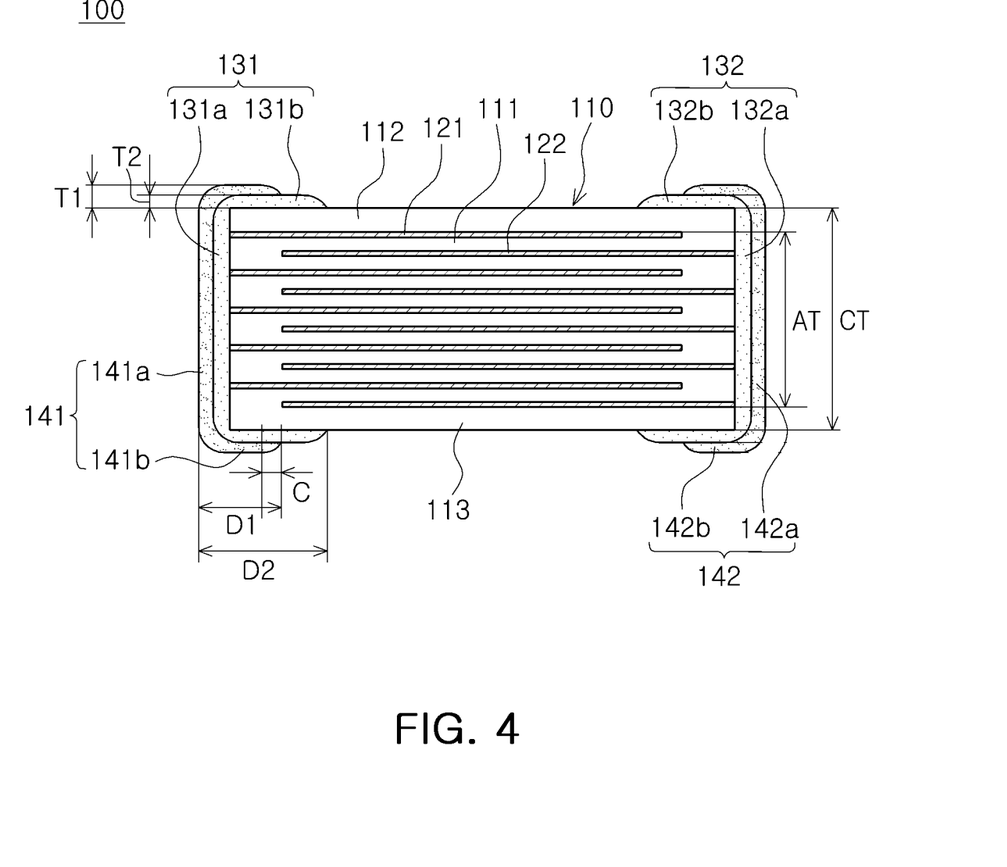

FIG. 1 is a perspective view schematically showing a multilayer ceramic capacitor according to an exemplary embodiment of the present disclosure, FIG. 2 is a front view of FIG. 1, and FIGS. 3 and 4 are cross-sectional views taken along line A-A' of FIG. 1.

Referring to FIGS. 1 through 4, a multilayer ceramic capacitor 100 according to an exemplary embodiment of the present disclosure may include a ceramic body 110 having a plurality of dielectric layers 111 stacked in a thickness direction of the ceramic body 110; a plurality of first and second internal electrodes 121 and 122; and first and second external electrodes electrically connected to the first and second internal electrodes 121 and 122, respectively.

The ceramic body 110 may be formed by stacking and then sintering the plurality of dielectric layers 111, wherein the plurality of dielectric layers 111 adjacent to each other may be integrated so as not to confirm a boundary therebetween without using a scanning electron microscope (SEM).

In addition, the ceramic body 110 may have a hexahedral shape. In the present exemplary embodiment, it may be defined that surfaces opposing each other in a thickness direction of the ceramic body 110 are first and second main surfaces, surfaces connecting the first and second main surfaces and opposing each other in the length direction of the ceramic body 110 are third and fourth end surfaces, and surfaces opposing each other in the width direction of the ceramic body 110 are fifth and sixth side surfaces.

In this case, the ceramic body 110 may have a so-called low profile or embedded form in which a length, a width, and a thickness thereof are 1.0 mm or less, 0.5 mm or less, and 0.2 mm or less, respectively, a length and a width thereof are 1.0 mm or less and 0.5 mm or less, respectively, and a thickness/width of the ceramic body 110 is 0.5 or less.

Meanwhile, the ceramic body 110 may include upper and lower cover layers 112 and 113 formed by allowing at least one dielectric layer without an internal electrode thereon to be stacked on upper and lower surfaces of an active region including the internal electrode formed thereon.

The dielectric layer 111 may include a ceramic material having a high dielectric constant, for example, may include a barium titanate ($BaTiO_3$)-based ceramic powder, but the present disclosure is not limited thereto as long as sufficient capacitance thereof is obtained.

In addition, the dielectric layer 111 may further include various kinds of ceramic additives, organic solvents, plasticizers, binders, dispersing agents, and the like, such as transition metal oxide or carbide, rare-earth elements, magnesium (Mg), aluminum (Al), or the like, as needed, together with the ceramic powder.

The first and second internal electrodes 121 and 122 having different polarities from each other may be stacked on at least one surface of a ceramic sheet forming the dielectric layer 111, and may be disposed in the ceramic body 110 so as to be alternately exposed through the third and fourth end surfaces, having the dielectric layer 111 interposed therebetween.

In this case, the first and second internal electrodes 121 and 122 are electrically insulated from each other by the dielectric layer 111 disposed therebetween and capacitance of the multilayer ceramic capacitor 100 is proportional to an area of the first and second internal electrodes 121 and 122 overlapped with each other in a stacking direction of the dielectric layers 111.

In addition, the first and second internal electrodes 121 and 122 are formed of a conductive metal and may be formed of one of, for example, silver (Ag), lead (Pb), platinum (Pt), nickel (Ni) and copper (Cu), or an alloy thereof, but the present disclosure is not limited thereto.

The first and second external electrodes may include first and second internal layers 131 and 132 having relatively low viscosity and first and second external layers 141 and 142 having higher viscosity than that of the first and second internal layers 131 and 132.

In this case, the viscosity of the first and second external layers 141 and 142 may be 1.5 to 2.5 times the viscosity of the first and second internal layers 131 and 132, but the present disclosure is not limited thereto.

In the present exemplary embodiment, the first and second internal layers 131 and 132 may include first and second internal head portions 131a and 132a respectively formed on the third and fourth end surfaces of the ceramic body 110 so as to cover and electrically connect the plurality of first and second internal electrodes 121 and 122 alternately exposed through the third and fourth end surfaces, and first and second internal bands 131b and 132b extended from upper and lower end portions of the first and second internal head portions 131a and 132a and formed on the first and second main surfaces of the ceramic body 110.

In this case, the first and second internal layers 131 and 132 may be formed using a copper-glass paste, for example, in order to have good electrical characteristics and provide high reliability such as an excellent heat cycle resistance property, a moisture resistance property, or the like, but the present disclosure is not limited thereto.

In addition, the first and second internal layers 131 and 132 may have a content of the conductive metal of 79 wt % or less of a total content. Referring to the following Table 1, it may be appreciated that the first and second internal layers 131 and 132 have compactness and thickness varied depending on the content of the conductive metal and a tear defect is caused in the case in which the content of the conductive metal exceeds 80 wt % of the total content. However, it may be appreciated that in the case in which the content of the conductive metal is 80 wt % of the total content, the compactness is good and the tear defect is not caused, but a thickness defect is caused since the thickness is 105% of a reference value.

TABLE 1

| Metal content (%) | Compactness (%) | Thickness (%) | Whether or not tear is caused |
|---|---|---|---|
| 100 | 99.5 | 125 | ○ |
| 90 | 99.1 | 113 | ○ |
| 80 | 98.5 | 105 | X |
| 70 | 97.5 | 95 | X |
| 60 | 95 | 94 | X |
| 50 | 93.5 | 89 | X |

In this case, other components except for the conductive metal of the first and second internal layers 131 and 132 are a binder, a solvent, and the like.

In addition, viscosity of the first and second internal layers 131 and 132 may be 5,000 to 25,000 cps, but the present disclosure is not limited thereto.

Referring to the following Table 2, it may be appreciated that the first and second internal layers 131 and 132 have compactness and thickness varied depending on the viscosity, a tear defect is caused in the case in which the viscosity is below 5,000 cps, and the thickness is too thick, for example, 120% of a reference value, and does not satisfy a size specification in the case in which the viscosity exceeds 30,000 cps, for example, is 40,000 cps.

TABLE 2

| Viscosity (cps) of first and second internal layers | Compactness (%) | Thickness (%) | Whether or not tear is caused |
|---|---|---|---|
| 50000 | 99.8 | 180 | X |
| 40000 | 99.3 | 120 | X |
| 30000 | 98.5 | 102 | X |
| 20000 | 98.1 | 101 | X |
| 5000 | 95.4 | 95 | X |
| 1000 | 85.3 | 50 | ○ |

The first and second external layers 141 and 142 may be formed on the first and second internal layers 131 and 132 and may serve to prevent the plating solution from being permeated into the internal electrode at the time of forming first and second plated layers described below.

The first and second external layers 141 and 142 may include first and second external head portions 141a and 142a respectively formed on first and second internal head portions 131a and 132a, and first and second external bands 141b and 142b formed on the first and second internal bands 131b and 132b, having a distance shorter than a distance of the first and second internal bands 131b and 132b formed on the first and second main surfaces, and formed such that end portions of the first and second internal bands 131b and 132b are exposed outwardly of first and second external bands.

In addition, the viscosity of the first and second external layers 141 and 142 may be 1.5 to 2.5 times the viscosity of the first and second internal layers 131 and 132.

Referring to the following Table 3, it may be appreciated that the defect in reliability may be caused due to insufficient compactness in the case in which the viscosity of the first and second external layers 141 and 142 is below 1.5 times the viscosity of the first and second internal layers 131 and 132, and the first and second external layers 141 and 142 may have relatively thick thickness in the case in which the viscosity of the first and second external layers 141 and 142 exceeds 2.5 times the viscosity of the first and second internal layers 131 and 132.

TABLE 3

| Ratio of external layer to internal layer | Whether or not reference compactness is satisfied | Whether or not reference thickness is satisfied | Whether or not reliability is satisfied |
|---|---|---|---|
| 0.5 | X | X | X |
| 1 | X | X | X |
| 1.5 | ○ | ○ | ○ |
| 2.5 | ○ | ○ | ○ |
| 3 | ○ | X | ○ |
| 5 | ○ | X | ○ |

In the present exemplary embodiment, the viscosity of the first and second external layers 141 and 142 may be 7,500 to 62,500 cps, but the present disclosure is not limited thereto.

Meanwhile, the first and second external electrodes may further have first and second plated layers (not shown) formed on outer surfaces thereof.

In addition, the first and second plated layers may include a nickel (Ni) plated layer formed on the surface of the first and second external electrodes and a tin (Sn) plated layer formed on the nickel plated layer.

The above-mentioned first and second plated layers are to increase adhesion strength between the multilayer ceramic capacitor 100 and the printed circuit board when mounting the multilayer ceramic capacitor 100 on the printed circuit board or the like using a solder, a plating process may be performed by known methods, and a lead-free plating process may be performed in consideration of environmental friendly factors, but the preset disclosure is not limited thereto.

Hereinafter, a dimensional relationship between components included in the present exemplary embodiment will be described in detail with reference to FIGS. 3 and 4.

In the present exemplary embodiment, a sum of thicknesses of the first or second internal band 131b or 132b and the first or second external band 141b or 142b is defined as T1, a thickness of the first or second internal band 131b or 132b is defined as T2, a sum of thicknesses of the first or second internal head portion 131a or 132a and the first or second external head portion 141a or 142a is defined as HT, a sum distances of bands of the first or second external electrode is defined as D2, a distance of the first or second external band 141b or 142b is defined as D1, a distance between internal edges of the first or second internal band 131b or 132b and the first or second external band 141b or 142b are defined as C, a thickness of the ceramic body 110 is defined as CT, and a thickness of an active region, for example, a portion including the plurality of first and second internal electrodes 121 and 122 is defined as AT.

For example, in a small size product having a length and width of 10×5 mm, in a case of a so-called low profile or embedded product in which the thickness of the multilayer ceramic capacitor is 0.2 mm or less or the thickness/width of the multilayer ceramic capacitor is 0.5 or less, the thickness of a sum distances of bands of the first or second external electrode is set as small as possible in order to realize high capacitance and a sum thickness of head portions of the first and second external electrodes contacting the first and second internal electrodes 121 and 122, for example, the thickness HT, a sum of thicknesses of the first or second internal head portion 131*a* or 132*a* and the first or second external head portion 141*a* or 142*a* is at least 10 μm or more and needs to be generally uniform in order to prevent the degradation in reliability caused by the plating solution permeation.

According to the present exemplary embodiment, by forming the first and second external electrodes in a double stacking structure having different viscosities, particularly, a double stacking structure in which the viscosity of the first and second external layers 141 and 142 is higher than that of the first and second internal layers 131 and 132 formed on an inner side, even when the so-called low profile or embedded product in which the length, width, and thickness of the ceramic body 110 are 1.0 mm or less, 0.5 mm or less and 0.2 mm or less, respectively, the length and width of the ceramic body 110 are 1.0 mm and 0.5 mm or less, respectively, and the thickness/width of the ceramic body 110 is 0.5 or less is fabricated, the degradation in reliability caused by the plating solution permeation may be prevented while the thickness of the first and second external electrodes is generally uniform.

For example, the thinness may be obtained by the first and second internal layers 131 and 132 having relatively low viscosity, and the thickness of the head portions of the first and second external electrodes may be uniform by the first and second external layers 141 and 142 having higher viscosity than that of the first and second internal layers 131 and 132.

Particularly, in a case of a product in which a ratio of the thickness of the active region to the thickness of the ceramic body 110 is 0.28 or more, it may be further difficult to maintain thickness uniformity of the head portion of the external electrode.

According to the present exemplary embodiment, when the thickness of the ceramic body 110 is defined as CT and the thickness of the active region including the plurality of first and second internal electrodes 121 and 122 is defined as AT, the range of $0.9 \geq AT/CT \geq 0.28$ may be satisfied.

Particularly, according to the present exemplary embodiment, even when the ratio of the thickness of the active region to the thickness of the ceramic body 110 is 0.28 or more, the sum thickness of the head portions of the first and second external electrodes may be uniformly maintained.

Meanwhile, according to the present exemplary embodiment, in order to satisfy a predetermined level of capacitance and maintain reliability by preventing the plating solution permeation, when the sum of thicknesses of the first or second internal band 131*b* or 132*b* and the first or second external band 141*b* or 142*b* is defined as T1, T1 may be 30 μm or less.

For example, when T1 is less than 30 μm, the plating solution may permeate into the ceramic body 110 to thereby cause a reliability problem.

In addition, when the distance of the first or second external band 141*b* or 142*b* is defined as D1, D1 may be 350 μm or less.

In addition, when the sum of thicknesses of the first or second internal band 131*b* or 132*b* and the first or second external band 141*b* or 142*b* is defined as T1 and the thickness of the first or second internal band 131*b* or 132*b* is defined as T2, a range of $1.2 \geq T2/T1 \geq 0.15$ may be satisfied.

In this case, when T2/T1 exceeds 1.2, reliability may be satisfied, but the thickness may be too thick, such that a reference size specification may not be satisfied, and when T2/T1 is below 0.15, reliability defects may be caused.

In addition, when the sum distances of bands of the first or second external electrode is defined as D2 and the distance of the first or second external band 141*b* or 142*b* is defined as D1, a range of $0.9 \geq D1/D2 \geq 0.02$ may be satisfied.

Referring to the following Table 4, it may be appreciated that in the case in which D1/D2 is below 0.02, reliability defect may be caused, and in the case in which D1/D2 exceeds 0.9, the reference size specification may not be satisfied.

TABLE 4

| D1/D2 | Whether or not reliability is satisfied | Whether or not size specification is satisfied | Process defect nonoccurrence rate (%) |
|---|---|---|---|
| 1.5 | ○ | X | 98 |
| 1 | ○ | ○ | 99 |
| 0.8 | ○ | ○ | 97 |
| 0.5 | ○ | ○ | 98 |
| 0.3 | ○ | ○ | 98 |
| 0.1 | ○ | ○ | 98 |
| 0.01 | ○ | ○ | 99 |
| 0 | X | ○ | 99 |

In addition, T2/T1 and D1/D2 represent a step ratio between the first or second internal layer 131 or 132 and the first or second external layer 141 or 142. When T2/T1 and D1/D2 deviate from the above-mentioned range, in the case in which the multilayer ceramic capacitor according to the present exemplary embodiment is applied as an embedded type, it may be difficult to secure reliability, and when via machining is performed on a substrate using a laser beam, via defects may be caused by laser diffused reflection, thereby increasing a substrate defect rate.

In addition, when the sum distances of bands of the first or second external electrode is defined as D2, and the distance between internal edges of the first or second internal band 131*b* or 132*b* and the first or second external band 141*b* or 142*b* are defined as C, a range of $10.0 \geq C/D2 \geq 0.02$ may be satisfied.

Referring to the following Table 5, it may be appreciated that in the case in which C/D2 exceeds 10, a process yield rate may be decreased and reliability defects may be caused, and in the case in which C/D2 is below 0.02, the reference size specification may not be satisfied.

TABLE 5

| C/D2 | Whether or not reliability is satisfied | Whether or not size specification is satisfied | Process yield rate (%) |
|---|---|---|---|
| 15 | X | ○ | 85 |
| 10 | ○ | ○ | 95 |
| 5 | ○ | ○ | 98 |
| 1 | ○ | ○ | 98 |
| 0.05 | ○ | ○ | 99 |
| 0.01 | ○ | X | 98 |
| 0 | ○ | X | 99 |

Hereinafter, a manufacturing method of a multilayer ceramic capacitor according to an exemplary embodiment of the present disclosure will be described.

First, a plurality of ceramic sheets are prepared.

The ceramic sheet for formation of the dielectric layer 111 of the ceramic body 110 may be fabricated as a sheet having a thickness of several µm by mixing a ceramic powder, a polymer, and a solvent to thereby prepare a slurry and applying the slurry to a carrier film to then be dried thereon by a doctor blade method or the like.

Next, the first and second internal electrodes 121 and 122 are formed by printing the conductive paste on at least one surface of the respective ceramic sheet to a predetermined thickness.

In this case, the first and second internal electrodes 121 and 122 are formed to be respectively exposed through both end surfaces in a length direction of the ceramic sheet.

In addition, as a method of printing the conductive paste, a screen printing method, a gravure printing method, or the like, may be used, but the present disclosure is not limited thereto.

Next, a multilayer body is prepared by stacking and compressing the plurality of ceramic sheets having the first and second internal electrodes 121 and 122 formed thereon in the thickness direction so that the first and second internal electrodes 121 and 122 are disposed to face each other, having the ceramic sheet formed therebetween.

Next, the multilayer body is cut into respective single chips corresponding to respective single capacitors to thereby be sintered at a relatively high temperature, such that a ceramic body 110 having first and second main surfaces opposing each other in a thickness direction of the ceramic body, third and fourth end surfaces opposing each other in a length direction of the ceramic body, to which the first and second internal electrodes 121 and 122 are alternately exposed, and fifth and sixth side surfaces opposing each other in a width direction of the ceramic body, is prepared.

Next, first and second external electrodes are formed on end surfaces of the ceramic body 110 so as to be electrically connected to the exposed portions of the first and second internal electrodes 121 and 122.

Hereinafter, a forming method of the first and second external electrodes will be described in detail.

First, the first and second internal layers 131 and 132 are formed to be extended from the third and fourth end surfaces of the ceramic body 110 to a portion of the first and second main surfaces thereof by using a first conductive paste having relatively low viscosity, such that the plurality of first and second internal electrodes 121 and 122 exposed through the third and fourth end surfaces of the ceramic body 110 are respectively covered therewith.

The first conductive paste may be applied using a dipping method or various printing methods, but the present disclosure is not limited thereto.

In addition, the first conductive paste may have the viscosity of 5,000 to 25,000 cps, but the present disclosure is not limited thereto.

In addition, the first conductive paste may have a content of a conductive metal of 79 wt % or less with respect to a total content.

In addition, after the application process, a heat treatment process is performed so that the applied first conductive paste is hardened.

Next, first and second external layers 141 and 142 are formed on the first and second internal layers 131 and 132 to be extended from the third and fourth end surfaces to the first and second main surfaces, using a second conductive paste having viscosity higher than that of the first conductive paste, wherein the first and second external layers 141 and 142 have first and second external bands 141b and 142b having a distance shorter than that of the first and second internal bands 131b and 132b formed on the first and second main surfaces so that portions of the first and second internal bands 131b and 132b of the first and second internal layers 131 and 132 are exposed outwardly of the first and second external bands 141b and 142b.

The second conductive paste may be applied using a dipping method or various printing methods, but the present disclosure is not limited thereto.

In addition, the second conductive paste may have viscosity of 1.5 to 2.5 times the viscosity of the first conducive paste and may have 7,500 to 62,500 cps in the present exemplary embodiment, but the present disclosure is not limited thereto.

In addition, after the application process, the heat treatment process is performed, such that the applied second conductive paste is hardened.

Meanwhile, after the forming of the first and second external layers 141 and 142, first and second plated layers (not shown) may be formed by performing a plating process on the surfaces of the first and second external electrodes using a method such as an electrical plating method or the like, as needed.

As a material used in the plating method, nickel or tin, a nickel-tin alloy, or the like may be used, but the present disclosure is not limited thereto.

In addition, the first and second plated layers may be formed by sequentially stacking a nickel plated layer and a tin plated layer on the surfaces of the first and second external electrodes.

As set forth above, according to exemplary embodiments of the present disclosure, the internal layer of the external electrode is formed by the conductive paste having lower viscosity than the that of a conductive paste forming the external layer thereof to thereby allow for the sum thickness of the band to be relatively thin, and the external layer is formed using a conductive paste having higher viscosity than that of the conductive paste forming the internal layer to thereby allow for the sum thickness of a head portion to be uniform, such that the thickness of the external electrode may be decreased and the phenomenon in which the plating solution permeates into the chip during the plating process to contact the internal electrode may be prevented, thereby improving reliability of products.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor, comprising:
  a ceramic body having a plurality of dielectric layers stacked therein;
  a plurality of first and second internal electrodes disposed in the ceramic body so as to be alternately exposed through both end surfaces of the ceramic body, having the dielectric layer interposed therebetween; and
  first and second external electrodes respectively electrically connected to the first and second internal electrodes,
  wherein the first and second external electrodes include,
  first and second internal layers respectively formed on both end surfaces of the ceramic body and including first and second internal head portions respectively electrically connected to exposed portions of the first and second internal electrodes and first and second internal bands formed on both main surfaces of the ceramic body; and first and second external layers including first and second external head portions respectively formed on the first and second internal head portions and first and second external bands formed on the first and second internal bands and having a distance shorter than a distance of the first and second internal bands formed on the first and second main surfaces, the first and second external layers having viscosity higher than that of the first and second internal layers.

2. The multilayer ceramic capacitor of claim 1, wherein the first and second internal layers have the viscosity of 5,000 to 30,000 cps.

3. The multilayer ceramic capacitor of claim 1, wherein the first and second external layers have the viscosity of 7,500 to 62,500 cps.

4. The multilayer ceramic capacitor of claim 1, wherein the first and second external layers have the viscosity of 1.5 to 2.5 times that of the first and second internal layers.

5. The multilayer ceramic capacitor of claim 1, wherein the ceramic body has a length, a width, and a thickness of 1.0 mm or less, 0.5 mm or less, and 0.2 mm or less, respectively.

6. The multilayer ceramic capacitor of claim 1, wherein the ceramic body has a length and a width of 1.0 mm or less and 0.5 mm or less, respectively, and has a thickness/width of 0.5 or less.

7. The multilayer ceramic capacitor of claim 1, wherein when a sum of thicknesses of the first or second internal band and the first or second external band is defined as T1, T1 is 30 μm or less.

8. The multilayer ceramic capacitor of claim 1, wherein when a sum of thicknesses of the first or second internal head portion and the first or second external head portion is defined as HT, HT is 10 μm or more.

9. The multilayer ceramic capacitor of claim 1, wherein when a thickness of the first or second external band is defined as D1, D1 is 350 μm or less.

10. The multilayer ceramic capacitor of claim 1, wherein when a sum of thicknesses of the first or second internal band and the first or second external band is defined as T1 and a thickness of the first and second internal bands is defined as T2, a range of $1.2 \geq T2/T1 \geq 0.15$ is satisfied.

11. The multilayer ceramic capacitor of claim 1, wherein when a sum distances of bands of the first or second external electrode is defined as D2 and a distance of the first or second external band is defined as D1, a range of $0.9 \geq D1/D2 \geq 0.02$ is satisfied.

12. The multilayer ceramic capacitor of claim 1, wherein when a sum distances of bands of the first or second external electrode is defined as D2 and a distance between internal edges of the first or second internal band and the first or second external band are defined as C, a range of $10.0 \geq C/D2 \geq 0.02$ is satisfied.

13. The multilayer ceramic capacitor of claim 1, wherein when a thickness of the ceramic body is defined as CT and a thickness of an active region including the plurality of first and second internal electrodes is defined as AT, a range of $0.9 \geq AT/CT \geq 0.28$ is satisfied.

14. The multilayer ceramic capacitor of claim 1, wherein the first and second internal layers have a content of a conductive metal of 79 wt % or less.

15. A manufacturing method of a multilayer ceramic capacitor, the method comprising:
preparing a multilayer body by stacking and compressing a plurality of ceramic sheets having first and second internal electrodes formed thereon so that the first and second internal electrodes are disposed to face each other, having the ceramic sheet interposed therebetween;
preparing a ceramic body by cutting the multilayer body into regions corresponding to respective single capacitors so that the first and second internal electrodes are alternately exposed through both end surfaces; and
forming first and second external electrodes on the ceramic body so as to be electrically connected to the first and second internal electrodes, respectively,
wherein the forming of the first and second external electrodes includes,
forming first and second internal layers from both end surfaces of the ceramic body to both main surfaces of the ceramic body using a first conductive paste; and
forming first and second external layers on the first and second internal layers, using a second conductive paste, such that bands of the first and second internal layers are partially exposed, the second conductive paste having viscosity higher than that of the first conductive paste.

16. The method of claim 15, wherein in the forming of the first and second internal layers, the first and second internal layers are formed using the first conductive paste having the viscosity of 5,000 to 30,000 cps.

17. The method of claim 15, wherein in the forming of the first and second external layers, the first and second external layers are formed using the second conductive paste having the viscosity of 7,500 to 62,500 cps.

18. The method of claim 15, wherein in the forming of the first and second external layers, the first and second external layers are formed using the second conductive pasts having the viscosity of 1.5 to 2.5 times that of the first conductive paste.

19. The method of claim 15, wherein in the forming of the first and second internal layers, the first and second internal layers are formed using the first conductive paste having a content of a conducive metal of 79 wt % or less.

* * * * *